United States Patent Office 3,542,885
Patented Nov. 24, 1970

3,542,885
CATALYTIC DIMERIZATION OF 1,3-BUTADIENE TO 4-VINYLCYCLOHEXENE
Larry G. Baumgard, Belpre, Ohio, and Donald C. Cronauer, Parkersburg, W. Va., assignors to Borg-Warner Corporation, Chicago, Ill., a corporation of Delaware
No Drawing. Filed Jan. 14, 1969, Ser. No. 791,171
Int. Cl. C07c 3/02, 3/10, 13/20
U.S. Cl. 260—666       5 Claims

ABSTRACT OF THE DISCLOSURE

A process for the dimerization of 1,3-butadiene to 4-vinylcyclohexene may be practiced to produce high yields by the use of certain catalyst systems which include (1) elemental sulfur, or (2) mercaptans.

BACKGROUND AND SUMMARY OF THE INVENTION

This invention relates to a process for the production of dimers of 1,3-butadiene, specifically 4-vinylcyclohexene, hereinafter referred to as 4–VC. More particularly, the invention is directed to an improved catalyst system which promotes dimerization to 4–VC, and inhibits polymer formation. Relatively high yields, for example, 40% to 80%, based on the weight of reacted butadiene, have been obtained.

1,3-butadiene, hereinafter referred to as BD, will dimerize to form 4–VC and 1,5-cyclooctadiene. At the temperature and pressure used in the dimerization reaction, polymerization of the BD can also occur. An important facet of the present disclosure is the discovery that catalytic dimerization of BD to 4–VC can be greatly increased with a concomitant reduction in polymer formation, by utilizing certain improved catalysts.

Dimerization of BD proceeds in two principal ways. In the head-to-tail dimerization, two molecules of BD combine in this fashion to form 1,5-cyclooctadiene. In the formation of 4–VC, one molecule of BD attaches across one of the double bonds of another monomeric BD molecule to form 4–VC. By using a catalyst to promote the dimerization, and favoring the formation of 4–VC, relative to the formation of 1,5-cyclooctadiene, the monomeric BD can be converted largely to 4–VC.

It should be noted that use of several of the catalysts to which the present invention pertains are known butadiene stabilizers. For example, in U.S. Pat. No. 2,373,754, there is a disclosure for the use of aliphatic mercaptans as polymerization inhibitors in the storage of BD monomers. There is, however, no suggestion for the use of such compounds as catalysts in a dimerization process.

Conventional catalyst systems for the dimerization of 4–VC described in the prior art include oxides, complex carbonyl compounds, olefins, metal salts, dialkylamines, metals, as well as ultraviolet radiation. Of those listed herein, the most effective have been found to be dialkylamines (discussed in U.S. Pat. No. 2,943,117), metal salts (discussed in U.S. Pat. No. 2,544,808), and metals, such as iron powder (discussed in German Pat. No. 949,466).

By the present invention, additional catalyst systems have been found which are reasonably inexpensive, and very effective in the production of 4-vinylcyclohexene. Catalyst systems which may be employed are (1) mercaptans and (2) elemental sulfur, preferably with a solvent such as dimethylformamide.

DETAILED DESCRIPTION OF THE INVENTION 4-vinylcyclohexene is produced from 1,3-butadiene by the process of this invention at temperatures of 120–160° C., pressures such as will maintain a liquid phase containing butadiene, and with 0.1 wt. percent or more of a catalyst selected from the group sulfur and mercaptan for a period of three hours or longer. A solvent, preferably dimethylformamide, may be used.

In order to further illustrate the invention, reference will be made herein to certain specific examples which are intended to be illustrative, and not in any sense limiting.

EXAMPLE I

A one liter stainless steel autoclave, equipped with a heating mantle, was charged with 5 g. of tert.-dodecylmercaptan (hereinafter referred to as t-DDM). After sealing the vessel, it was cooled by placing it in a Dry Ice-acetone bath, and evacuated to 2 to 3 inches of Hg to remove most of the air. The autoclave was then charged with approximately 200 g. of BD, heated to 130–140° C., and held for 8 hours. The reaction mixture was then allowed to cool to room temperature, and after venting the unreacted BD, the residual liquid was fractionated to determine the yield of 4–VC. This yield, using t-DDM was 71.4%, based on the weight of reacted BD.

Using the same procedure as outlined in Example I above, other catalyst systems were tested. The table below groups together such additional examples.

TABLE I

| Example No. | Catalyst | Weight of catalyst charged (gm.) | Weight of charged (gm.) | Yield of 4-VC based on reacted BD (wt. percent) | Yield of 4-VC based on BD charged (wt. percent) |
|---|---|---|---|---|---|
| II | None | | 40 | 2.0 | |
| III | Elemental sulfur with 25 ml. of dimethylformamide | 5.0 | 190 | 44.6 | 40 |
| IV | Elemental sulfur with 150 ml. of dimethylformamide | 0.2 | 100 | 93.4 | 15.5 |
| V | Elemental sulfur | 5.0 | 200.1 | 44.5 | 28.1 |
| VI | Tert.-dodecylmercaptan | 5.0 | 199.5 | 71.4 | 37.9 |
| VII | Mixed tertiary mercaptans (B.P. 179–302° F. ave. M.W.=215) | 5.0 | 200 | 78.8 | 51.7 |
| VIII | n-dodecylmercaptan | 5.0 | 200 | 68.2 | 46.8 |

While this invention has been described in connection with certain specific embodiments thereof, it is to be understood that this is by way of illustration, and not by way of limitation, and the scope of the appended claims should be construed as broadly as the prior art will permit.

What is claimed is:
1. The process of dimerizing 1,3-butadiene to produce 4-vinylcyclohexene which comprises maintaining 1,3-butadiene in contact with at least 0.1% by weight of a catalyst selected from the group consisting of (1) mercaptans, and (2) elemental sulfur and maintaining the reaction for at least three hours at a temperature between 120° and 160° C. at a pressure sufficient to maintain a liquid phase containing 1,3-butadiene and in the absence of a polybutadiene polymerization catalyst.
2. The process as defined in claim 1, wherein said catalyst is elemental sulfur.
3. The process as defined in claim 1, wherein said catalyst is a aliphatic mercaptan.
4. The process as defined in claim 3, wherein said catalyst is tert.-dodecylmercaptan.

5. The process as defined in claim 3, wherein said catalyst is n-dodecylmercaptan.

References Cited
UNITED STATES PATENTS

| | | | |
|---|---|---|---|
| 2,373,754 | 4/1945 | Fryling et al. | 260—666.5 |
| 2,943,117 | 6/1960 | Gleason | 260—666 |
| 3,207,798 | 9/1965 | Franz | 260—666.5 |
| 3,167,593 | 1/1965 | Mueller. | |
| 3,076,045 | 1/1963 | Schneider. | |

DELBERT E. GANTZ, Primary Examiner

V. O'KEEFE, Assistant Examiner

UNITED STATES PATENT OFFICE
CERTIFICATE OF CORRECTION

Patent No. 3,542,885      Dated November 24, 1970

Inventor(s) Larry G. Baumgard et al.

It is certified that error appears in the above-identified patent and that said Letters Patent are hereby corrected as shown below:

Columns 1 and 2, Table I, fourth column, in the the heading "Weight of" should read -- Weight of BD --; same column, line 4, "2.0.1" should read -- 201.1 --.

Signed and sealed this 1st day of June 1971.

(SEAL)
Attest:

EDWARD M. FLETCHER, JR.       WILLIAM E. SCHUYLER, JR
Attesting Officer      Commissioner of Patents